United States Patent
Towal

(10) Patent No.: US 10,515,304 B2
(45) Date of Patent: Dec. 24, 2019

(54) FILTER SPECIFICITY AS TRAINING CRITERION FOR NEURAL NETWORKS

(71) Applicant: QUALCOMM Incorporated, San Diego, CA (US)

(72) Inventor: Regan Blythe Towal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 950 days.

(21) Appl. No.: 14/848,283

(22) Filed: Sep. 8, 2015

(65) Prior Publication Data

US 2016/0321540 A1    Nov. 3, 2016

Related U.S. Application Data

(60) Provisional application No. 62/154,089, filed on Apr. 28, 2015.

(51) Int. Cl.
| | | |
|---|---|---|
| G06N 3/08 | (2006.01) | |
| G06N 3/04 | (2006.01) | |
| G06K 9/46 | (2006.01) | |

(52) U.S. Cl.
CPC .............. *G06N 3/08* (2013.01); *G06K 9/4628* (2013.01); *G06N 3/04* (2013.01)

(58) Field of Classification Search
CPC ............ G06N 3/08; G06N 3/049; G06N 3/02; G06N 3/0454; G06N 99/005; G06N 3/04; G06N 3/0472; G06N 3/0445; G06N 3/0481; G06N 3/084; G06N 7/005; G06N 3/00; G06N 3/0427; G06N 3/088; G06N 3/10; G06N 7/00; H04N 5/23222; H04N 1/00307; H04N 1/00347; H04N 1/00973; H04N 1/32117; H04N 2201/0074; H04N 5/23206; H04N 5/23216; H04N 5/23219; H04N 5/247; H04N 5/23203; G06K 9/4628; G06K 9/6267; G06K 9/00597; G06K 9/00604; G06K 9/6227; G06K 9/6256;
(Continued)

(56) References Cited

U.S. PATENT DOCUMENTS

| | | | |
|---|---|---|---|
| 8,160,354 B2 | 4/2012 | Paquier | |
| 8,229,209 B2 | 7/2012 | Paquier | |

(Continued)

FOREIGN PATENT DOCUMENTS

JP    2002245464 A    8/2002

OTHER PUBLICATIONS

Denil M., et al., "Predicting Parameters in Deep Learning," Jun. 3, 2013 (Jun. 3, 2013), pp. 1-9, XP055277618, Retrieved from the Internet: URL:https://arxiv.org/pdf/1306.0543v2.pdf [retrieved on Jun. 3, 2016].

(Continued)

*Primary Examiner* — Paulinho E Smith
(74) *Attorney, Agent, or Firm* — Seyfarth Shaw LLP

(57) ABSTRACT

A method of training a neural network model includes determining a specificity of multiple filters after a predetermined number of training iterations. The method also includes determining whether to continue training each filter of the multiple filters based at least in part on the specificity. The method further includes classifying an input based on features obtained by convolving the input with the trained filters.

20 Claims, 13 Drawing Sheets

(58) Field of Classification Search
CPC .............. G06K 9/6284; G06K 9/00187; G06K 9/00201; G06K 9/00664; G06K 9/00684; G06K 9/3241; G06K 9/4604; G06K 9/4619; G06K 9/52; G06K 9/6269; G06K 9/6272; G06K 9/66; G06K 9/72; G06K 9/00503; H03H 17/00; H03H 21/00
See application file for complete search history.

(56) References Cited

U.S. PATENT DOCUMENTS

| | | | |
|---|---|---|---|
| 8,744,141 | B2 | 6/2014 | Derakhshani et al. |
| 2003/0018595 | A1* | 1/2003 | Chen .................. G06K 9/6228 706/12 |
| 2003/0174881 | A1 | 9/2003 | Simard et al. |
| 2014/0310208 | A1 | 10/2014 | Fasel et al. |
| 2015/0078629 | A1 | 3/2015 | Gottemukkula et al. |
| 2016/0162782 | A1* | 6/2016 | Park .................. G06N 3/0454 706/17 |
| 2017/0147920 | A1* | 5/2017 | Huo ....................... G06N 3/08 |

OTHER PUBLICATIONS

Devrim A., et al., "GPU Accelerated Training if Image Convolution Filter Weights using Genetic Algorithms," Applied Soft Computing, Feb. 15, 2015 (Feb. 15, 2015), vol. 30, pp. 585-594, XP029209055, ISSN: 1568-4946, DOI: 10.1016/J.ASOC.2015.02.010.

International Search Report and Written Opinion—PCT/US2016/021886—ISA/EPO—dated Jun. 23, 2016.

Kumar R., et al., "Trainable Convolution Filters and Their Application to Face Recognition," IEEE Transactions on Pattern Analysis and Machine Intelligence, IEEE Computer Society, USA, Jul. 1, 2012 (Jul. 1, 2012), vol. 34, No. 7 , pp. 1423-1436, XP011444696, ISSN: 0162-8828, DOI: 10.1109/TPAMI.2011.225.

Roberto R., et al., "Learning Separable Filters," IEEE Computer Society Conference on Computer Vision and Pattern Recognition, Proceedings, IEEE Computer Society, US, Jun. 23, 2013 (Jun. 23, 2013), pp. 2754-2761, XP032493253, ISSN: 1063-6919, DOI: 10.1109/CVPR.2013.355 [retrieved on Oct. 2, 2013].

Ryan F.S., et al.,"Filter Forests for Learning Data-Dependent Convolutional Kernels," 2014 IEEE Conference on Computer Vision and Pattern Recognition, IEEE, Jun. 23, 2014 (Jun. 23, 2014), pp. 1709-1716, XP032649395, DOI: 10.1109/CVPR.2014.221 [retrieved on Sep. 24, 2014].

Yosinski J., et al., "How Transferable are Features in Deep Neural Networks?," Nov. 6, 2014 (Nov. 6, 2014), pp. 1-9, XP055277610, Retrieved from the Internet: URL:https://papers.nips.cc/paper/5347-how-transferable-are-features-in-deep-neural-networks.pdf [retrieved on Jun. 3, 2016].

* cited by examiner

FILTER SPECIFICITY AS TRAINING CRITERION FOR NEURAL NETWORKS

CROSS REFERENCE TO RELATED APPLICATION

This application claims the benefit under 35 U.S.C. § 119(e) to U.S. Provisional Patent Application No. 62/154,089 entitled "FILTER SPECIFICITY AS TRAINING CRITERION FOR NEURAL NETWORKS," filed on Apr. 28, 2015, the disclosure of which is expressly incorporated herein by reference in its entirety.

BACKGROUND

Field

Certain aspects of the present disclosure generally relate to neural system engineering and, more particularly, to systems and methods for using filter specificity as a training criterion for neural networks.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect of the present disclosure, a method for training a neural network model is disclosed. The method includes determining a specificity of multiple filters after a predetermined number of training iterations. The method also includes training each of the filters based on the specificity.

Another aspect of the present disclosure is directed to an apparatus including means for determining a specificity of multiple filters after a predetermined number of training iterations. The apparatus also includes means for training each of the filters based on the specificity.

In another aspect of the present disclosure, a non-transitory computer-readable medium has non-transitory program code recorded thereon. The program code is executed by a processor and includes program code to determine a specificity of multiple filters after a predetermined number of training iterations. The program code also includes program code to train each of the filters based on the specificity.

Another aspect of the present disclosure is directed to an apparatus for training a neural network model having a memory and one or more processors coupled to the memory. The processor(s) is configured to determine a specificity of multiple filters after a predetermined number of training iterations. The processor(s) is also configured to train each of the filters based on the specificity.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
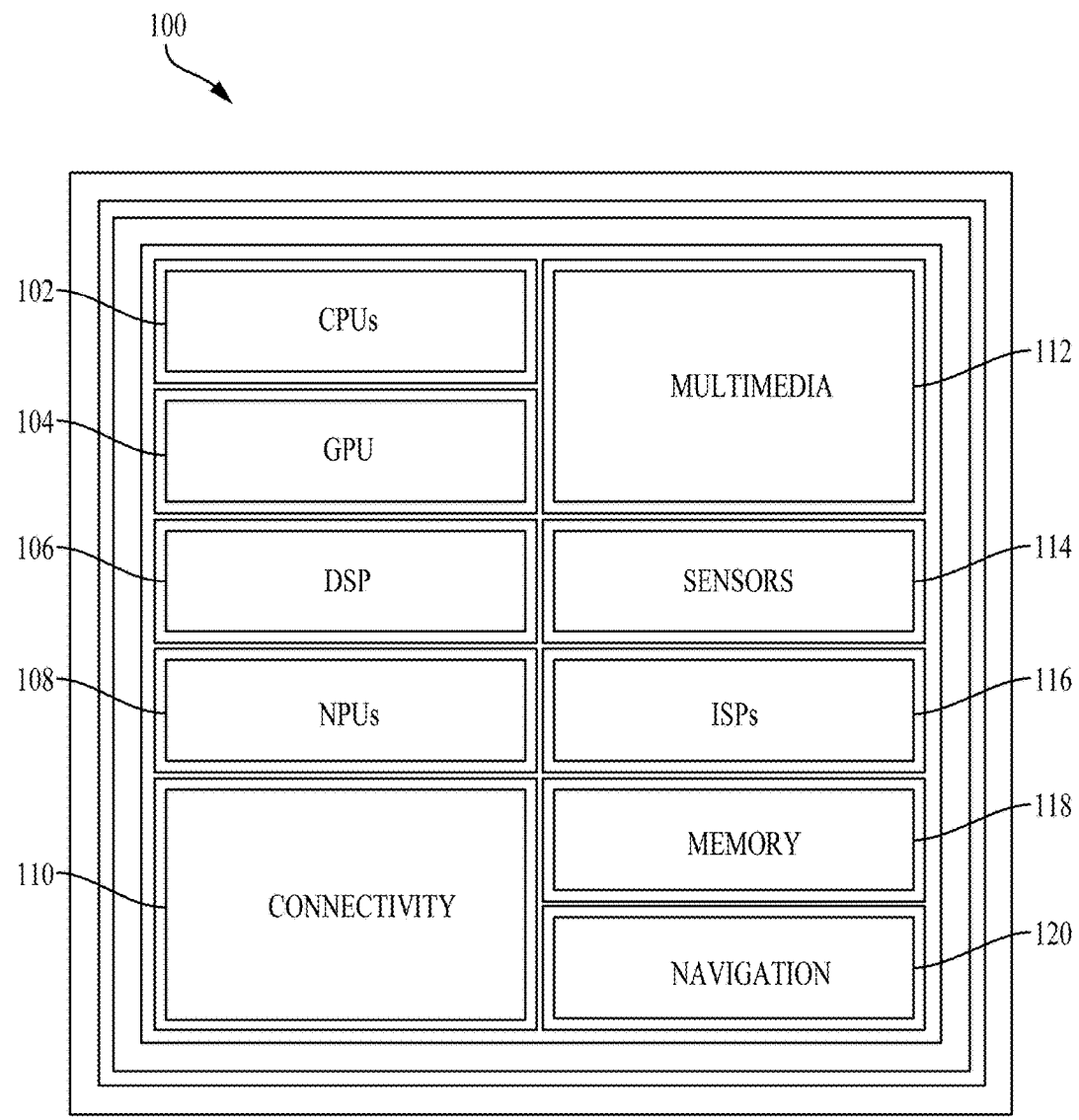
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For neural networks and/or other systems, filters may be used to determine the content of an input. For example, a filter may be applied to an audio input to determine whether a specific voice is present. In another example, a filter may be applied to an image to determine if a specific object, such as a car, is present in the image. In some cases, the quality of the filters may be reduced when the training set is small, the model is too large, and/or the training set includes errors. Filters with a reduced quality may be referred to as weak filters. Weak filters or partially learned filters may not provide the discriminative basis that is specified to determine the content of an input.

Thus, aspects of the present disclosure are directed to improving the quality of filters. Specifically, in one configuration, when training a neural network model, a specificity of one or more filters is determined after a predetermined number of training iterations. Furthermore, in this configuration, the network determines whether to continue training each filter based on the specificity.

FIG. 1 illustrates an example implementation of the aforementioned network training using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108 or in a dedicated memory block 118. Instructions executed at the general-purpose processor 102 may be loaded from a program memory associated with the CPU 102 or may be loaded from a dedicated memory block 118.

The SOC 100 may also include additional processing blocks tailored to specific functions, such as a graphics processing unit (GPU) 104, a digital signal processor (DSP) 106, a connectivity block 110, which may include fourth generation long term evolution (4G LTE) connectivity, unlicensed Wi-Fi connectivity, USB connectivity, Bluetooth™ connectivity, and the like, and a multimedia processor 112 that may, for example, detect and recognize gestures. The SOC 100 may also include a sensor processor 114, image signal processors (ISPs), and/or navigation 120, which may include a global positioning system. The SOC may be based on an ARM instruction set.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth™ connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for determining a specificity of multiple filters after a predetermined number of training iterations. The instructions loaded into the general-purpose processor 102 may also comprise code for training each filter of the multiple filters based at least in part on the specificity.

Figure 2:
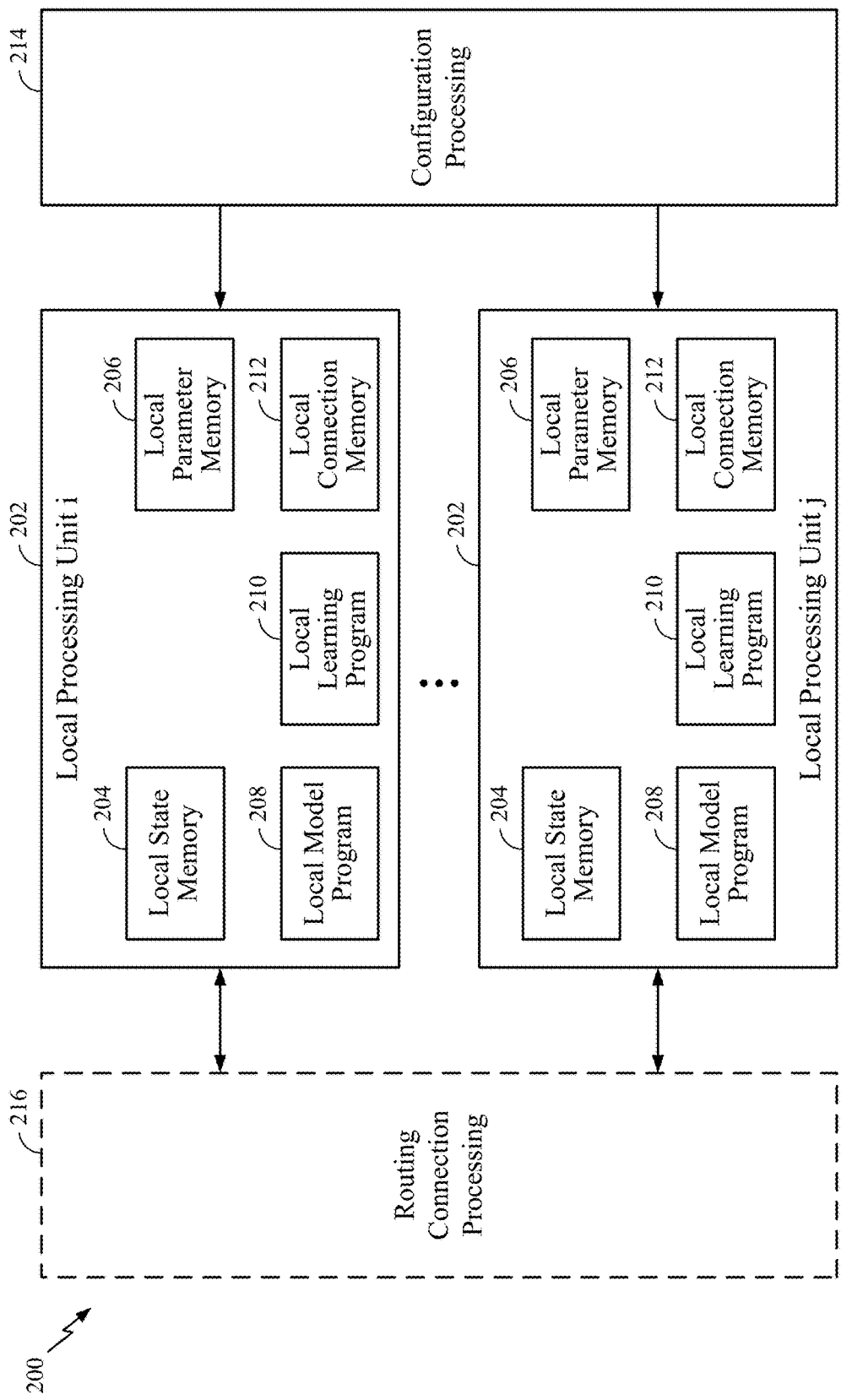
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
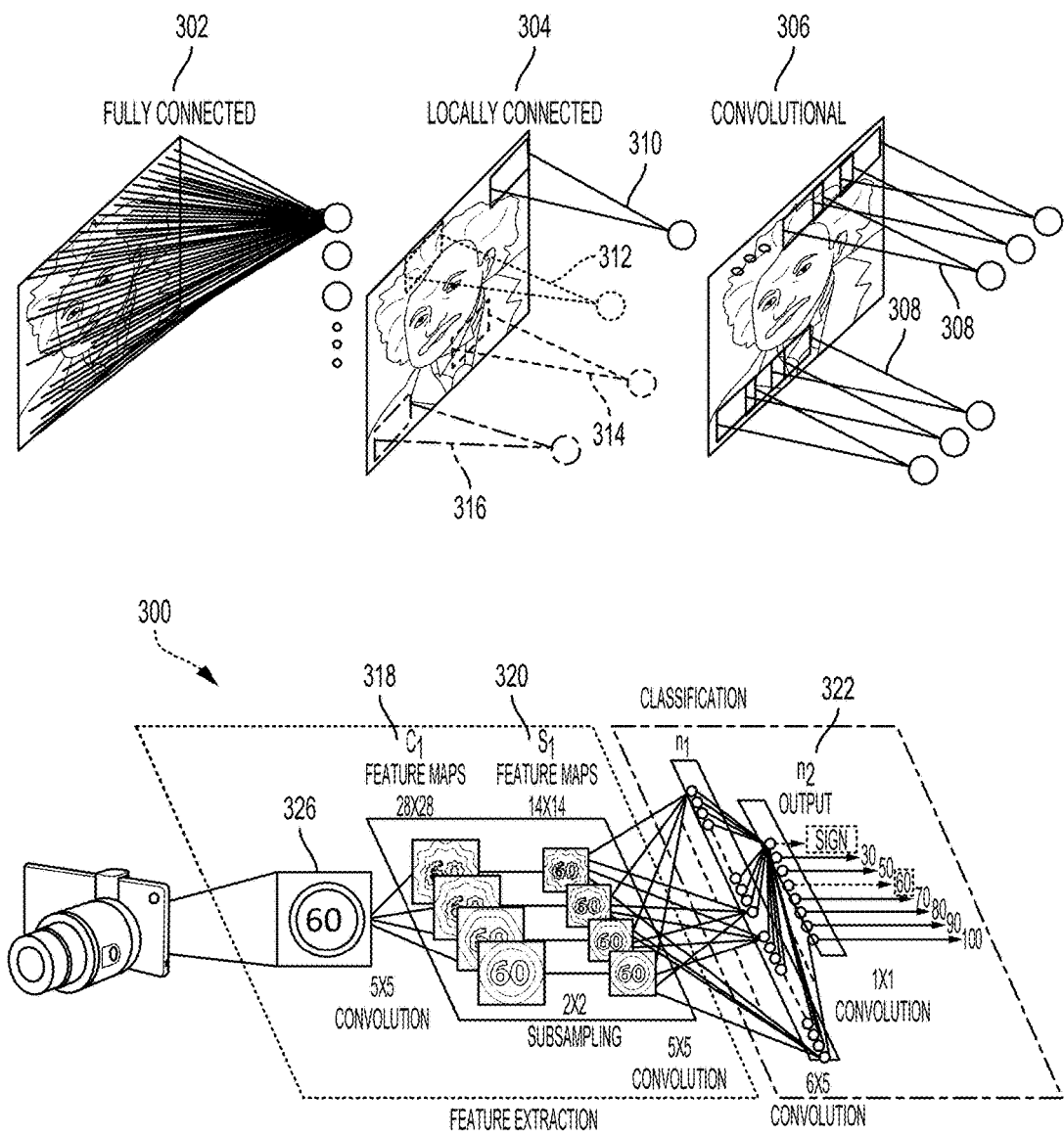
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
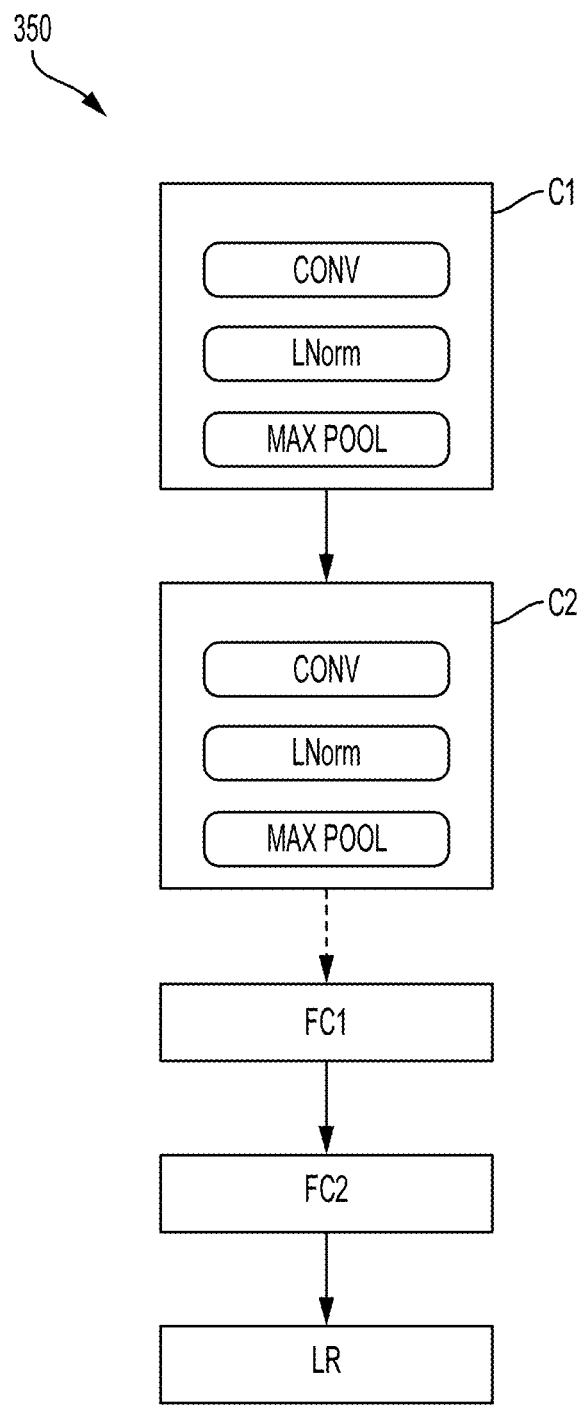
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
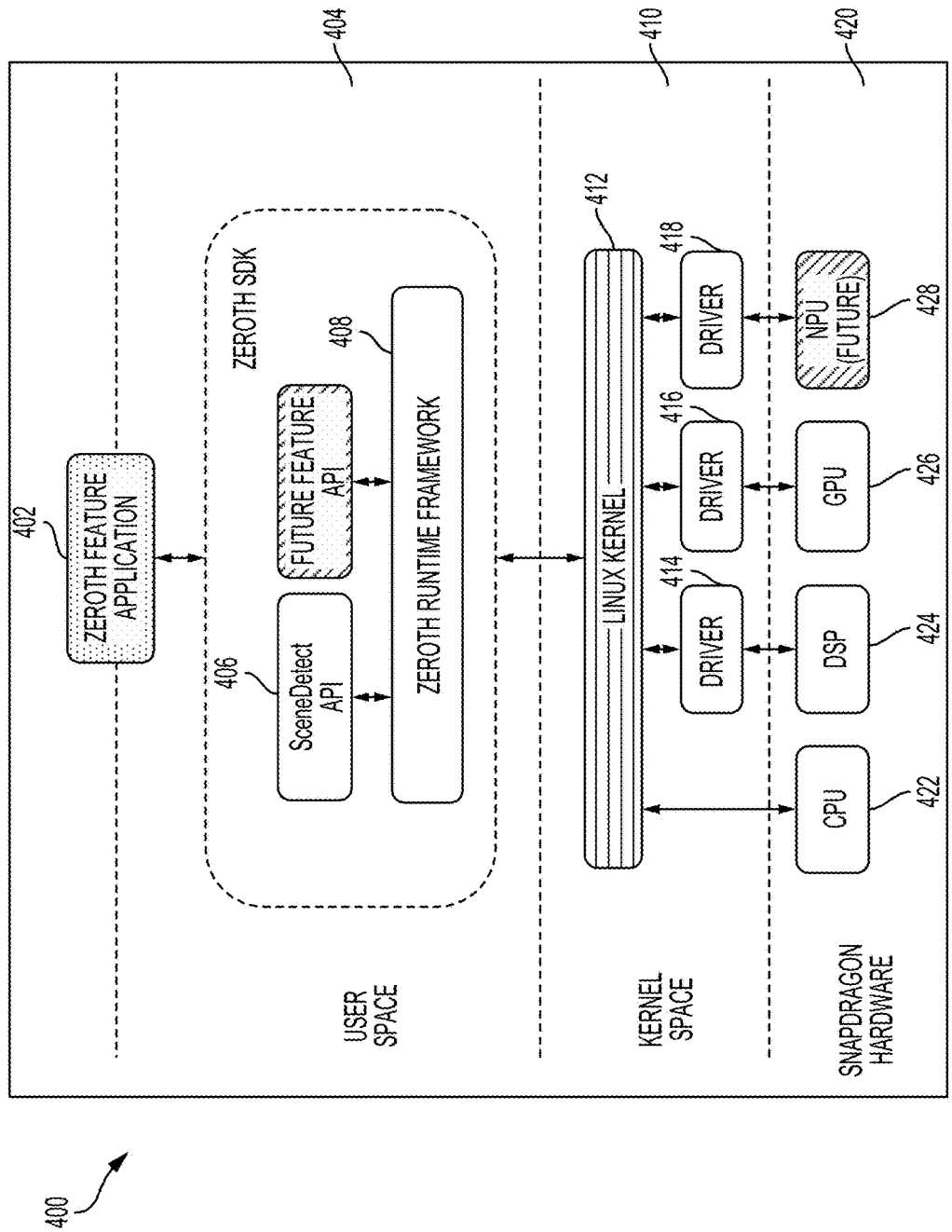
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux™ Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414, 416, 418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
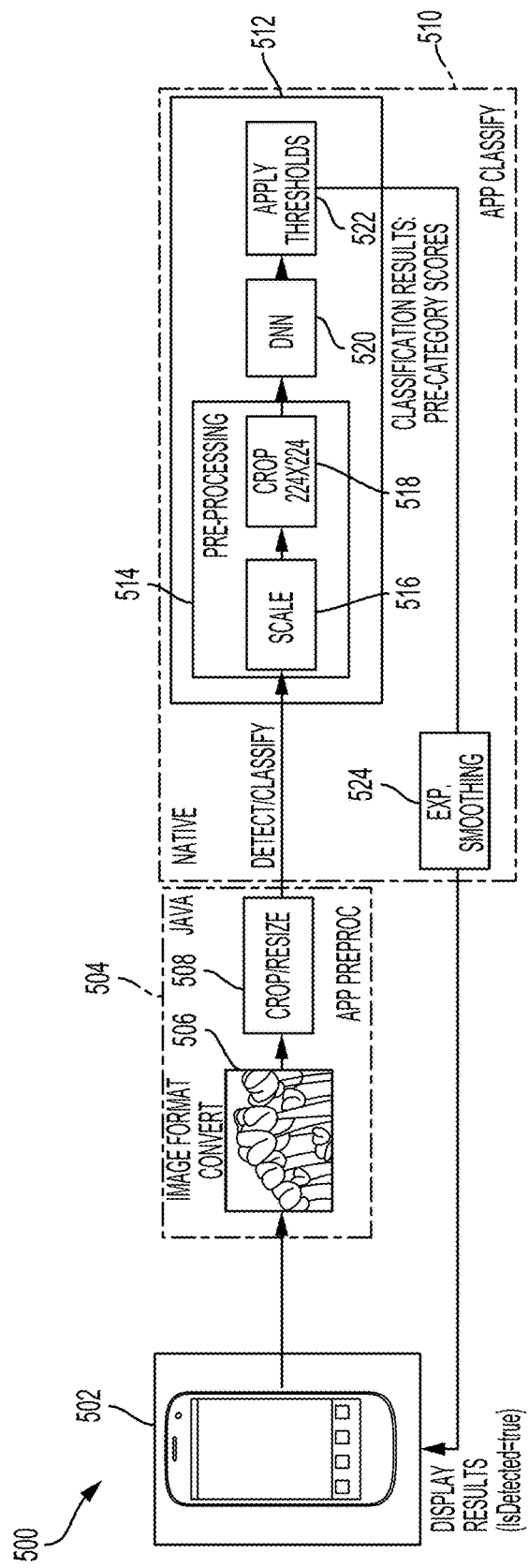
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA™ programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model is configured for determining a specificity of multiple filters after a predetermined number of training iterations; and training each filter of the multiple filters based at least in part on the specificity. The model includes a determining means and/or training means. In one aspect, the determining means and/or training means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Filter Specificity as Training Criterion for Neural Networks

In conventional systems, a filter may be specified to modify and/or enhance an input, such as an image. Additionally, a filter may be used to determine if a specific element is present in an input. For example, the filter may determine if a horizontal line is present in a 3×3-pixel portion of an image. Thus, a system may determine whether specific content is present in an input by applying various types of filters. Accordingly, various filters may be used to classify the input. Aspects of the present disclosure are described for an image as an input. Still, aspects of the present disclosure are not limited to an image and are contemplated for other types of inputs, such as audio, video, sensor data and/or other input data.

In conventional systems, convolution may be specified for linear filtering of an image. Specifically, the convolution output is the weighted sum of input pixels. The matrix of weights may be referred to as the convolution kernel, or filter. The convolution may be obtained by a matrix multiply of a linearized image and a linearized filter.

Additionally, conventional neural networks use back propagation for training Back propagation uses a known output, for each input value, to calculate the loss function gradient (i.e., error). That is, back propagation is specified to calculate the gradient of the error of the network from the network's modifiable weights. In most cases, the gradient is used to determine weights for filters that reduce the error.

Figure 6:
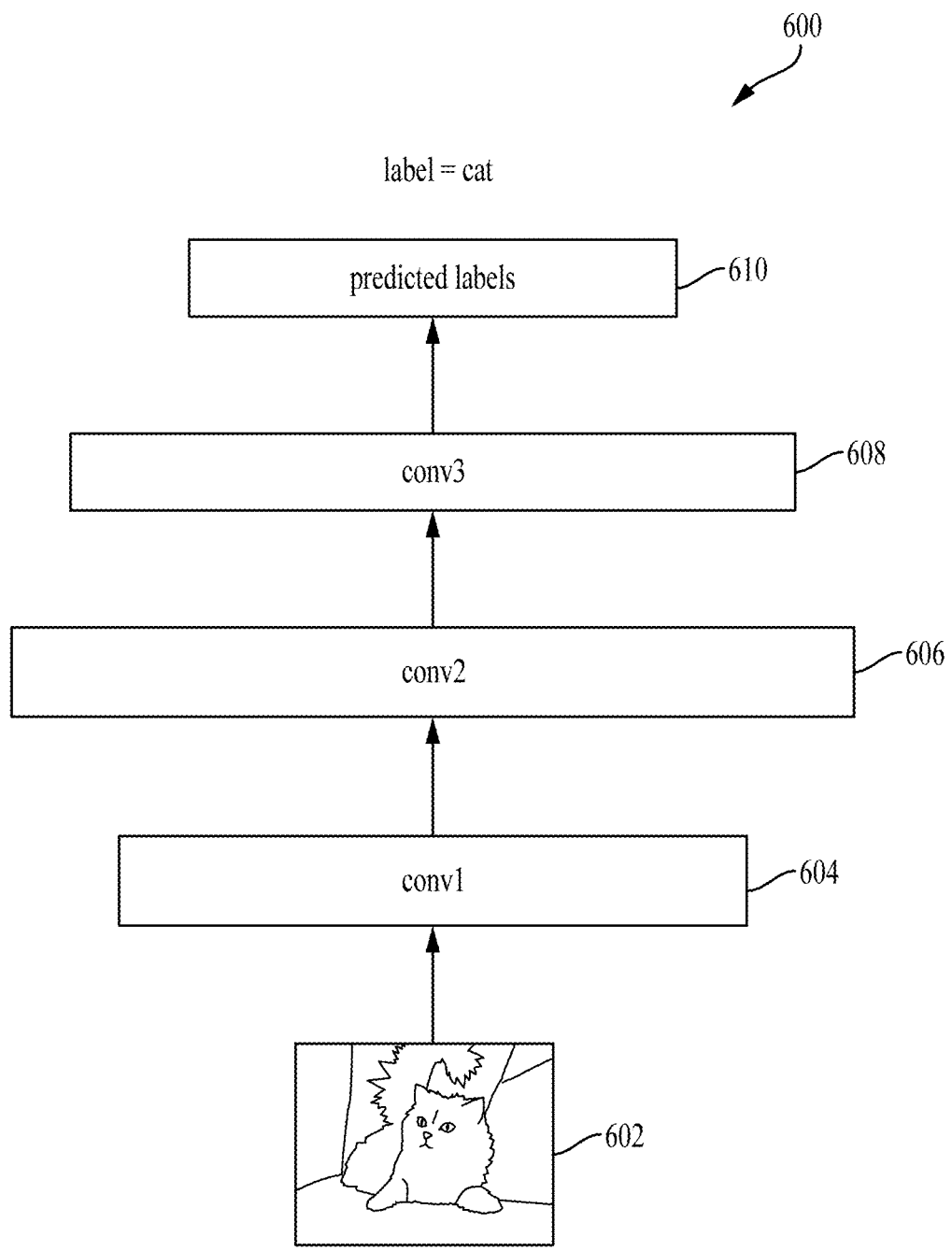
FIG. 6 is a flow diagram illustrating a conventional process for back propagation.

FIG. 6 illustrates an example of a flow diagram 600 for back propagation. In this example, a known output (i.e., label) of the image is cat. Thus, the label is set to cat and the predicted label should be cat. Furthermore, an image 602 of a cat is input to a first convolution layer 604. The first convolution layer 604 outputs the results of the convolution to the second convolution layer 606. Furthermore, the second convolution layer 606 outputs the results of the convolution to a third convolution layer 608. Finally, a predicted label 610 is output from the third convolution layer 608. Of course, aspects of the present disclosure are not limited to three convolution layers and more or less convolution layers may be specified as desired.

The labels of an image may be represented as vectors. For example, based on the example of FIG. 6, the labels for cat and dog may be a vector such as (1,0), such that 1 is the vector for cats and 0 is the vector for dogs. Furthermore, as an example, based on the network's training, the network may have a 50% confidence that the input image is a cat. The confidence may be referred to as the predicted probability. That is, the predicted label output for cat may be 0.5. Therefore, the error for that cat is a function of a different between 1 and 0.5 (i.e., (1−0.5)). Furthermore, the network may have a 20% confidence, based on the training, that the input image is a dog. Thus, the predicted label output for dog may be 0.2. Therefore, the error for dog is a function of a difference between 0 and 0.2 (i.e., (0−0.2)).

The error function is used to train the network based on the difference between the labels and the predicted labels. Specifically, an error may be determined as follows:

$$\text{Error}=f(\text{labels}-\text{predicted labels}) \quad (1)$$

The error function is based on a confidence output of the network based on an input image. Furthermore, based on the calculated error, such as 0.5 for cat, the weights of the filters are adjusted in accordance with the following equations:

$$\frac{\partial \text{error}}{\partial w_{ij}} = \frac{\partial \text{error}}{\partial \text{output}_j} \frac{\partial \text{output}_j}{\partial \text{activation\_fcn}_j} \frac{\partial \text{activation\_fcn}_j}{\partial w_{ij}} \quad (2)$$

$$\Delta w_{ij} = -\alpha \frac{\partial \text{error}}{\partial w_{ij}} \quad (3)$$

EQUATIONS 2 and 3 are conventional back propagation equations. In EQUATIONS 2 and 3 $w_{ij}$ is the weight between neurons $_i$ and $_j$. Furthermore, as shown in EQUATION 2, a partial derivative of the error is calculated with respect to the weight of the filter ($w_{ij}$). The right side of EQUATION 2 is based on the conventional chain rule. To update the weight ($w_{ij}$) using gradient descent, a learning rate $\alpha$ is selected. As shown in EQUATION 3, a change in weight $\Delta w_{ij}$, which is added to the old weight, $w_{ij}$, is equal to the product of the learning rate and the gradient, multiplied by −1. The −1 is specified to update in the direction of a minimum, not a maximum, of the error function.

Based on EQUATION 3, if the weight of a filter is high and the weight contributed to the error, the weight may be decreased by a greater amount in comparison to a weight that was low and did not contribute to the error. Additionally, based on EQUATION 3, a filter is updated if the partial derivative of the error is non-zero.

In most cases, because the error function is a global function, the individual weights of the network are disregarded as long as the error is reduced such that the predicted label is accurate. The global function may be used to generate various specific filters. As previously discussed, weak filters may be obtained when the training set is small, the model is too large, and/or the training set includes errors.

Figure 7:
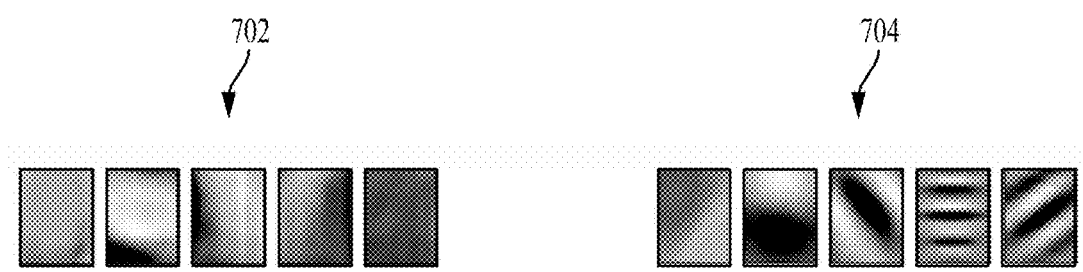
FIGS. 7-10 illustrate examples of filters after various training iterations according to aspects of the present disclosure.

FIG. 7 illustrates a set of weak filters 702 compared to a set of strong filters 704. As shown in FIG. 7, the weak filters 702 do not have specific definitions. For example, each of the weak filters 702 is generalized and does not have a well-defined outline. In contrast, the definition of the strong filters 704 is greater than the definition of the weak filters 702, such that various lines and angles are visible. The strong filters 704 improve the detection of specific features of an input, such as whether one or more horizontal lines are present in an image.

As an example, the network may be tasked with discriminating between a dog and a cat. In this example, a limited number of training samples or an error in training may be present. For example, the filters may only be trained on images of white cats and black dogs. Therefore, in this example, the filters may be generalized to various shades of grey due to the limited training samples. Thus, in this example, the greyscale filters may discriminate between black dogs and white cats. Still, the greyscale filters may not discriminate between different colored cats and dogs, such as a brown dog or orange cat. Therefore, it is desirable to mitigate the use of filters that are weak due to, for example, a limited number of training samples and/or errors in training. Still, errors in training samples may be unknown. For example, the bias of real world training sets may be unknown or limited. Specifically, a training set from a mobile device may be limited to only images captured by the user.

To mitigate weak filters resulting from limited training sets and/or errors in training, aspects of the present disclosure are directed to training the network based on the calculated error from back propagation and training the network based on filter specificity. The filter specificity refers to the strength of a filter.

The specificity of the filter may be calculated based on various factors, such as the distribution of the weights. In one configuration, the filter specificity is measured based on entropy $\Sigma_i p(w_i) \log_2 p(w_i)$. Entropy is a measurement of a difference in pixels in a filter. In another configuration, the filter specificity is measured based on a change from an original value $\Sigma_i w_i(t) - w_i(t_0)$. In yet another configuration, the filter specificity is measured based on a variance of weight values $$\frac{1}{\text{filter specificity}}.$$

In still yet another configuration, the filter specificity is measured based on a difference from other filters $\Sigma_b \sqrt{\Sigma_i (w_{a,i} - w_{b,i})^2}$. In another configuration, the filter specific-ity is measured based on cross-correlation with other filters. In the aforementioned equations, w is the filter weight. Although several metrics have been listed, the present disclosure is intended to encompass any similarity metric.

Furthermore, in one configuration, an error term is specified for the filter specificity. For example, the filter specificity error may be calculated by $$\frac{1}{N} \sum_i (w_i - \overline{w})^2.$$

In this example, if the filter specificity is low then the error is large. Alternatively, if the filter specificity is high then the error is low.

Thus, based on aspects of the present disclosure, the training is specified to output a correct label in addition to obtaining filters with improved specificity. That is, aspects of the present disclosure are directed to obtaining filters that are specific with regard to various features.

Figure 8:
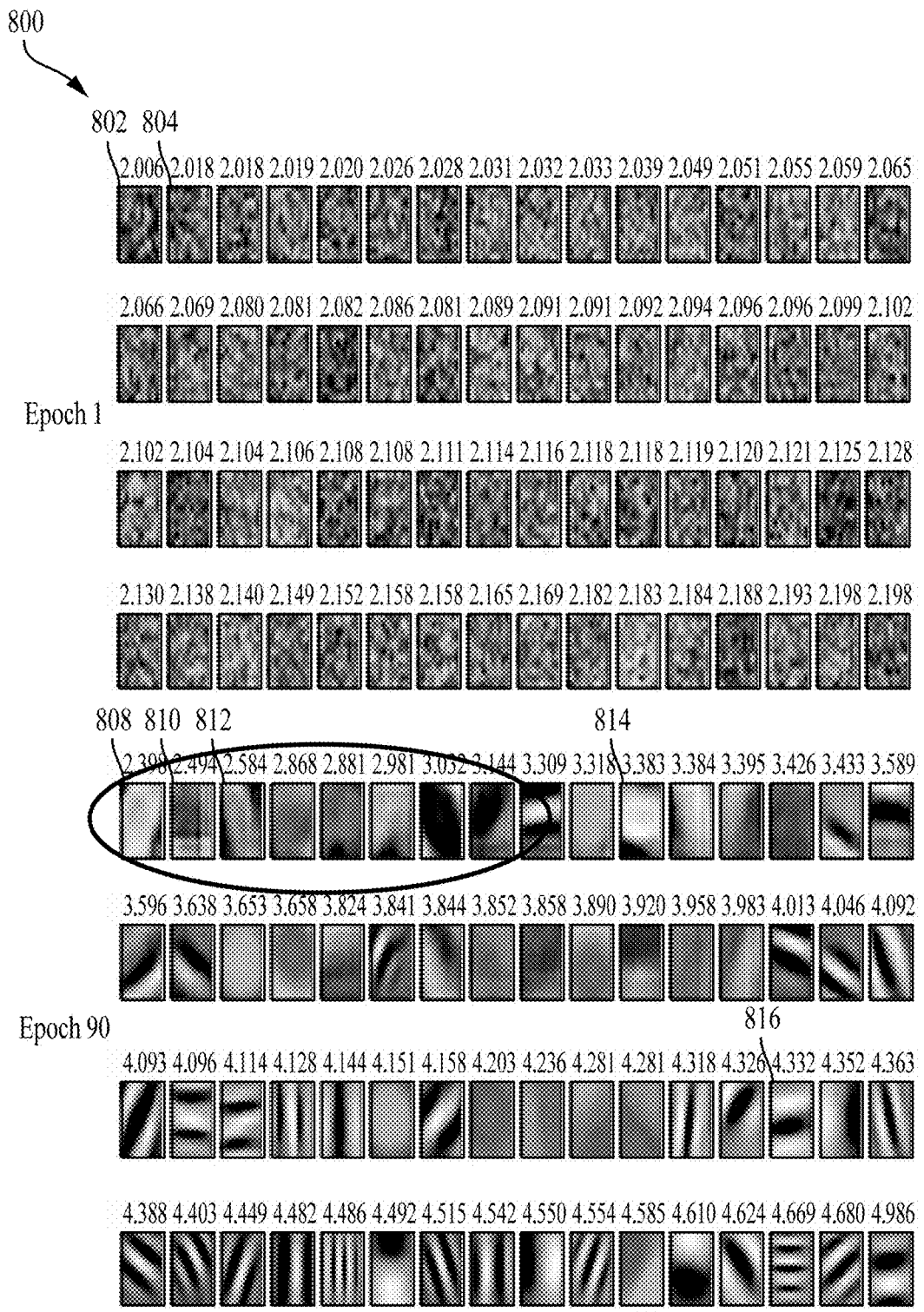

FIG. 8 illustrates an example of filters 800 trained from a first training iteration (epoch 1) and the same filters 800 after a ninetieth training iteration (epoch 90). The training iterations may sometimes be referred to as training passes. In this example, a data set may have a specific number of images, such as ten thousand. The training uses the images from the data sets to adjust the weights of the filters based on the weight update equation (EQUATION 3). The weights of the filters may be adjusted after training on a specific number of images from the data set, such as one hundred images. Thus, in this example, based on ten thousand images and updating the weight after one hundred images, the weights would be adjusted one hundred times during each epoch.

As shown in FIG. 8 at the first training pass, each filter has a specific entropy. For example, a first filter 802 has an entropy of 2.006 and a second filter 804 has an entropy of 2.018. The filters in the first training pass are ordered from low entropy to high entropy. Furthermore, as shown in FIG. 8, the entropy of each filter is modified after the ninetieth training pass (epoch 90). The filters in the ninetieth training pass are ordered from low entropy to high entropy. It should be noted that because the filters in both epoch 1 and epoch 90 are ordered from low entropy to high entropy, the same filters do not have the same positions in each figure. That is, the first filter 808 of epoch 1 may or may not be the first filter 808 of epoch 90. In other words, the first filter 802 of epoch 1 may have had a greater change in entropy in comparison to neighboring filters such that the first filter 802 of epoch 1 may be, for example, an eleventh filter 814 of epoch 90.

More specifically, at the first training pass, the filters are randomized. Furthermore, after a certain number of training passes, such as ninety, when the filters are not adjusted based on specificity, some filters have a high specificity while other filters have a low specificity. In this example, the specificity is determined based on the entropy of the filter.

As shown in FIG. 8 the entropy of the filters of epoch 90 is increased after approximately ninety training passes. Still, some filters may have little change between training passes. For example, a second filter 810 of epoch 90 has an entropy of 2.494 and a third filter 812 of epoch 90 has an entropy of 2.584. Thus, the entropies of the second filter 810 and third filter 812 have had little change since the initial training pass.

As previously discussed, aspects of the present disclosure are not limited to determining the specificity of filters based only on entropy. The specificity may also be determined via other calculations.

Additionally, as previously discussed, it is desirable to have detailed filters to determine specific features of an object. For example, the eleventh filter 814 of epoch 90 has a low level of detail represented by the low entropy. Thus, the eleventh filter 814 of epoch 90 may only add additional noise to subsequent layers. In contrast, a forty-sixth filter 816 of epoch 90 has a high entropy and includes details for horizontal lines. Thus, the forty-sixth filter 816 may determine if horizontal lines are present in an image.

In some cases, it is desirable to improve filter specificity while reducing the error from back propagation. A joint cost function may be specified for back propagation to determine the total error from back propagation. In one configuration, the joint cost function is a sum of the labeling error and the function of the filter specificity. For example, the joint cost function is $$\left(\text{labeling error} + \frac{1}{\text{filter specificity}}\right).$$

That is, the error function is augmented with an aggregated measurement of the specificity of the filters. The joint cost function may be based on a summary measure of all filter specificities in a network or may be layer based. Additionally, it is desirable to reduce the total error during the training. Thus, in one configuration the filter weights are changed to improve the filter specificity if the weights calculated based on the errors result in low filter specificity.

In another configuration, the training of filters that have a particular specificity is terminated to reduce computation costs. That is, the learning of filters that have a specificity that is greater than or equal to a threshold is stopped so that the weights of the filters are no longer updated.

Figure 9:
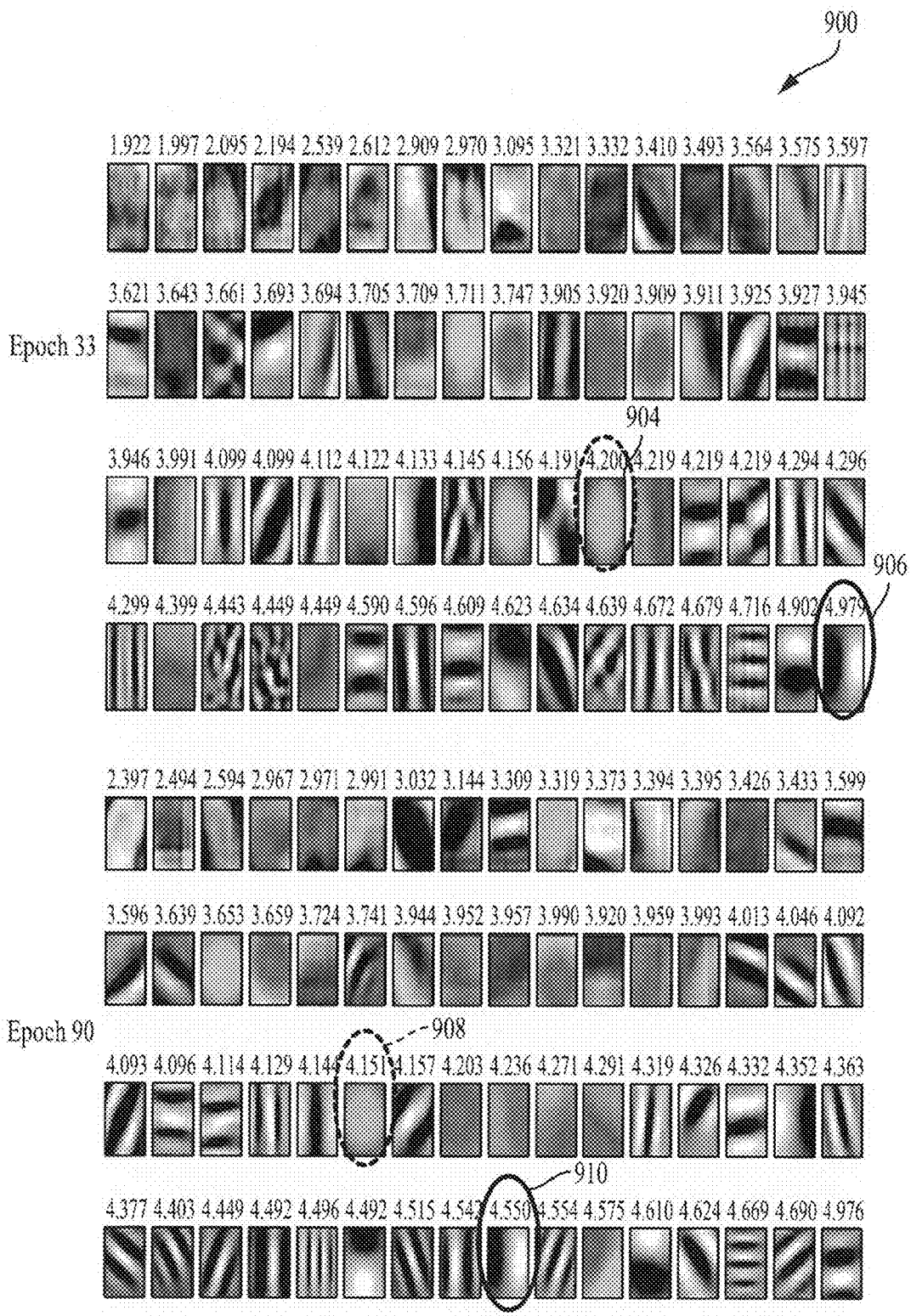

FIG. 9 illustrates an example of a set of filters 900 that are used for training. The filters for the thirty-third training pass (epoch 33) are ordered from low to high entropy. As shown in FIG. 9, from the filters 900 of epoch 33, a forty-third filter 904 has an entropy of 4.2 and a sixty-fourth filter 906 has an entropy of 4.979. Furthermore, as shown in FIG. 9, the filters 900 of epoch 90 are ordered from low to high entropy based on the ninetieth training pass. From the filters 900 of epoch 90, the thirty-eighth filter 908 has an entropy of 4.151 and a fifty-seventh filter 910 has an entropy of 4.550. The entropy of the thirty-eighth filter 908 and the entropy of the fifty-seventh filter 910 are both greater than a threshold. Therefore, in this example, the training of the thirty-eighth filter 908 and the fifty-seventh filter 910 may be terminated to reduce computation costs. The threshold may be predetermined and/or adjusted based on results of the training.

Additionally, or alternatively, in one configuration, the network may monitor the specificity of filters over time. As an example, as shown in FIG. 9, the forty-third filter 904 from epoch 33 correlates to the thirty-eighth filter 908 of epoch 90. Additionally, as shown in FIG. 9, the sixty-fourth filter 906 of epoch 33 correlates to the fifty-seventh filter 910 of epoch 90.

As shown in FIG. 9, the entropy of the forty-third filter 904 and sixty-fourth filter 906 of epoch 33 has not increased or decreased more than a specific threshold between the thirty-third pass and the ninetieth pass. Therefore, in this example, after the specificity of a filter is greater than a threshold, a change of specificity is monitored over time. Accordingly, the training of the filters may be terminated to reduce computation costs when the change of specificity is less than a threshold over time.

In yet another configuration, filters are selected for training based on a target network complexity. The target network complexity may be based on a memory specification, such as an amount of memory specified for the network, and/or power specifications, such as an amount of computing power specified for the network. In this configuration, a specific number of filters may be trained based on the determined complexity. The specific number of filters may be selected prior to terminating the training for one or more filters based on the filter specificity or after terminating the training for one of more filters based on the filter specificity.

Additionally, or alternatively, based on the target network complexity, the network may prioritize specific filters to continue training. The prioritization may be performed prior to terminating the training for one or more filters based on the filter specificity or after terminating the training for one of more filters based on the filter specificity.

In another configuration, prior to terminating the training for one or more filters based on the filter specificity or after terminating the training for one of more filters based on the filter specificity, the filters may be prioritized based on the specificity of each filter. The prioritization may be used to determine the filters that may be applied to an input. Furthermore, according to one aspect of the present disclosure, a number of filters may be selected from the prioritized filters based on the target network complexity.

Figure 10:
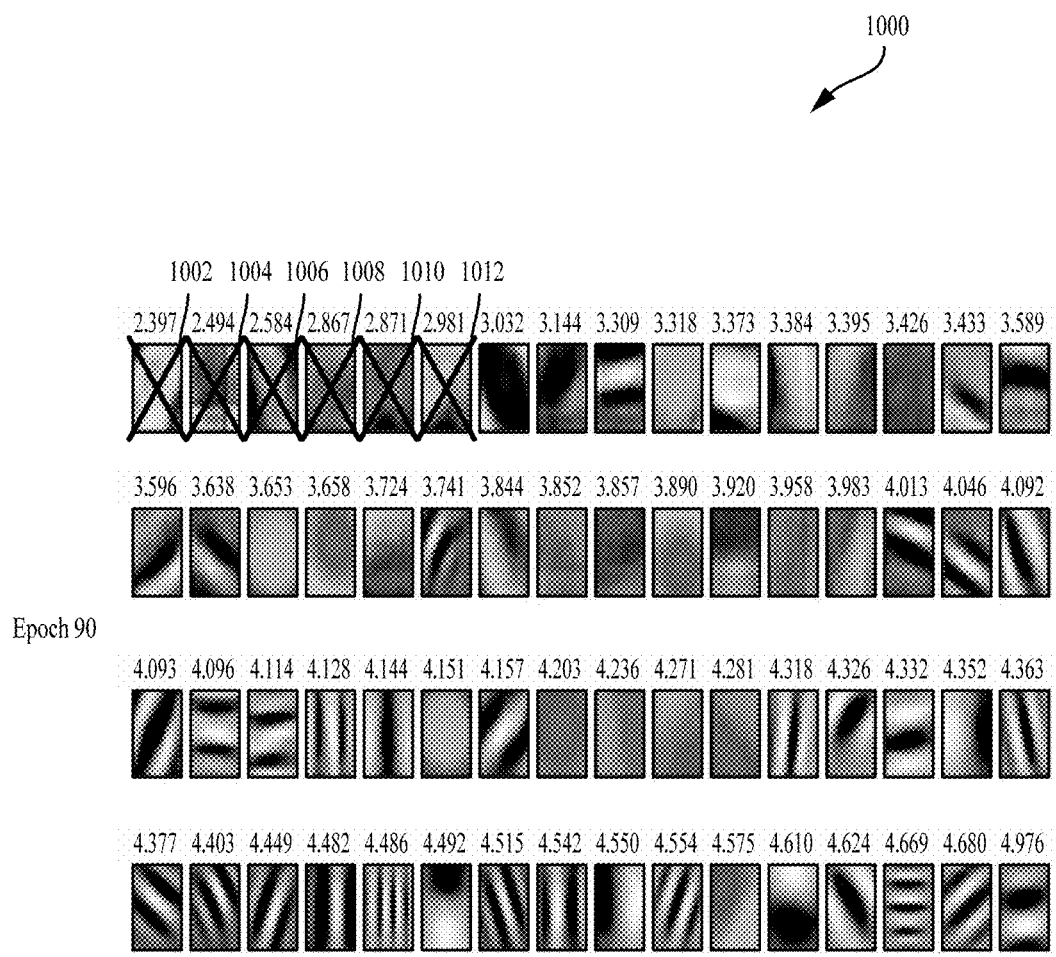

In yet another configuration, after a predetermined number of training passes, filters with a specificity that is less than a threshold may be eliminated from the training. FIG. 10 illustrates an example of a set of filters 1000 after ninety training passes. As shown in FIG. 10, the filters are ordered from low to high based on entropy. In this example, the first six filters 1002, 1004, 1006, 1008, 1010, 1012 have an entropy that is less than a threshold, such as three. Therefore, because the entropy of the filters 1002, 1004, 1006, 1008, 1010, 1012 is less than three, the first six filters 1002, 1004, 1006, 1008, 1010, 1012 are eliminated from training. Additionally, because weak filters may add additional noise to inputs, filters that are removed from training may not be applied to an input.

Figure 11:
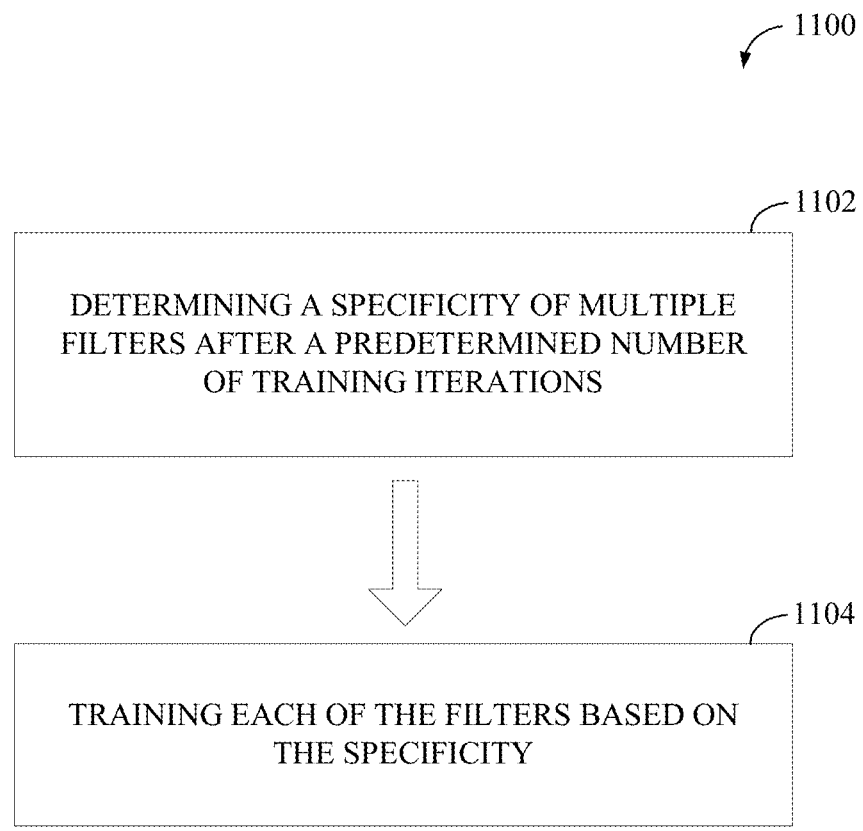
FIGS. 11 and 12 are flow diagrams illustrating methods for training filters in accordance with aspects of the present disclosure.

FIG. 11 illustrates a method 1100 of training a neural network model. At block 1102, a specificity of multiple filters is determined after a predetermined number of training iterations. At block 1104, each of the filters is trained based on the specificity.

Figure 12:
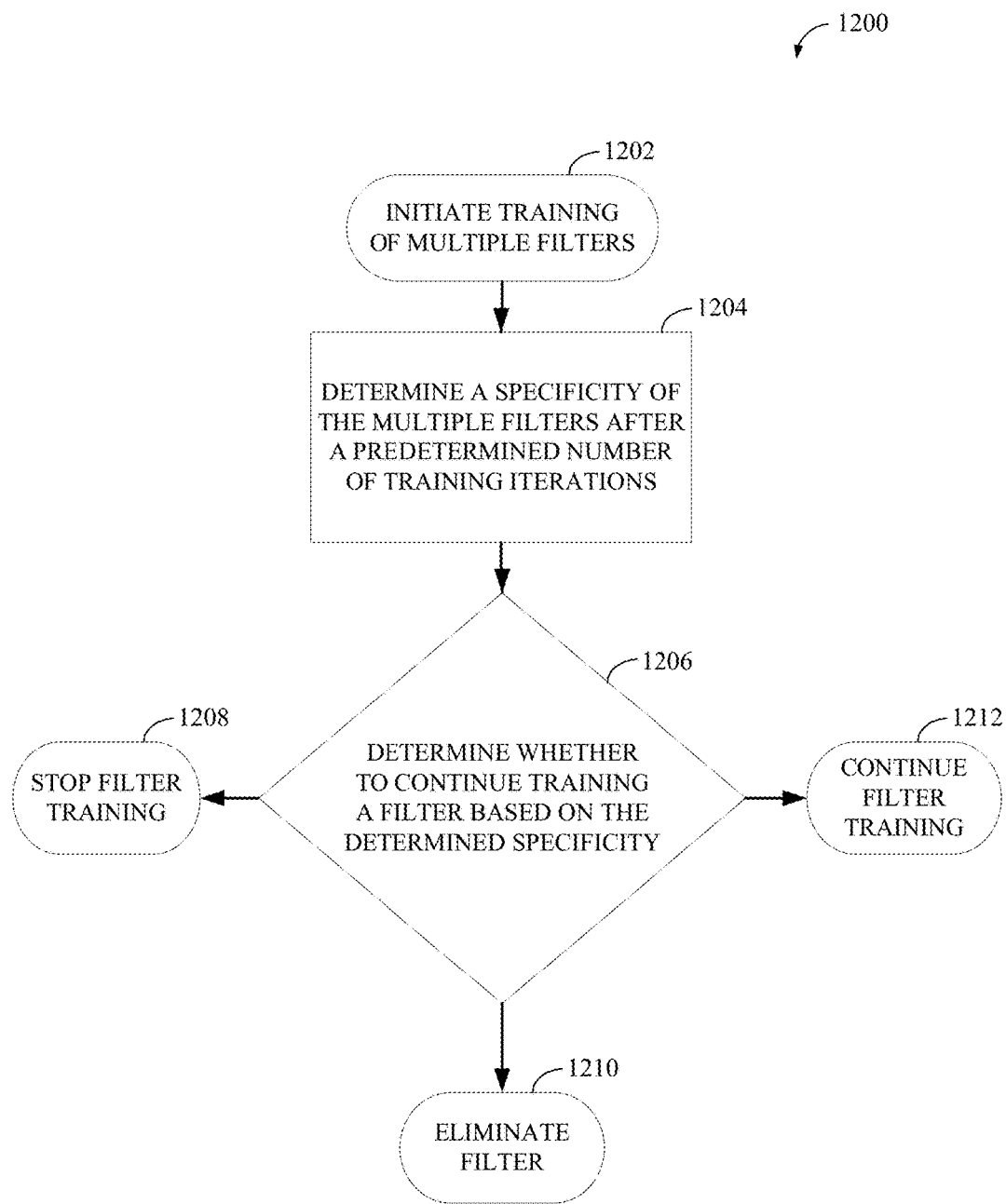

FIG. 12 illustrates a flow diagram 1200 for training a neural network model. At block 1202, training is initiated for multiple filters. As previously discussed, a filter may be used to determine if a specific element is present in an input. Furthermore, filters may be trained using back propagation. Additionally, at block 1204, the neural network model determines a specificity of the multiple filters after a predetermined number of training iterations. Furthermore, at block 1206, the neural network model determines whether to continue training a filter based on the determined specificity.

In one configuration, if the determined specificity of a filter is greater than a threshold, the network stops training the filter (block 1208). Additionally, or alternatively, the network stops training the filter (block 1208) when a change in the specificity of the specific filter is less than a threshold after the predetermined number of training iterations. In another configuration, as shown in block 1210, a filter is eliminated from the neural network model when the specificity of the specific filter is less than a threshold after the predetermined number of training iterations.

In another configuration, the training of a filter may continue based on the determined specificity (block 1212).

For example, the training may continue if the specificity is greater than a first threshold and less than a second threshold. Additionally, or alternatively, the network continues training the filter (block 1212) when a change in the specificity of the specific filter is greater than a first threshold and less than a second threshold after a predetermined number of training iterations.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of training a convolutional neural network model, comprising:
    determining a specificity of a plurality of filters after a predetermined number of training iterations, each of the plurality of filters representing a plurality of weights;
    eliminating a filter of the plurality of filters when a difference between an initial specificity of the filter and the determined specificity of the filter is less than a threshold;
    determining whether to continue the training of each remaining filter based at least in part on the specificity;
    continuing, after eliminating the filter, training each remaining filter of the plurality of filters based at least in part on the specificity;
    stopping training for a specific filter of the plurality of filters when the specificity of the specific filter is greater than a threshold; and
    classifying an input based on features obtained by convolving the input with the plurality of trained filters.

2. The method of claim 1, further comprising stopping training of a specific filter when a change in the specificity of the specific filter is less than a threshold after the predetermined number of training iterations.

3. The method of claim 1, in which the specificity is based on at least one of entropy, change from original values, variance weight values, difference from other filters, cross correlation with other filters, or a combination thereof.

4. The method of claim 1, in which the neural network model is trained while an error function is augmented with a pooled measure of the specificity of the plurality of filters.

5. The method of claim 1, further comprising determining a number of filters to train based on at least one of memory specification, power specifications, or a combination thereof.

6. The method of claim 5, further comprising selectively training filters of the plurality of filters based on the determined number of filters to train.

7. The method of claim 1, further comprising:
prioritizing filters to apply to the input based at least in part on the specificity of each of the plurality of filters; and
selecting a number of prioritized filters based at least in part on a target network complexity of the neural network model.

8. The method of claim 7, in which the target network complexity is based on at least one of memory specification, power specifications, or a combination thereof.

9. An apparatus for training a convolutional neural network model, comprising:
a memory unit; and
at least one processor coupled to the memory unit, the at least one processor configured:
to determine a specificity of a plurality of filters after a predetermined number of training iterations, each of the plurality of filters representing a plurality of weights;
to eliminate a filter of the plurality of filters when a difference between an initial specificity of the filter and the determined specificity of the filter is less than a threshold;
determining whether to continue the training of each remaining filter based at least in part on the specificity;
to continue, after eliminating the filter, to train each remaining filter of the plurality of filters based at least in part on the specificity;
stopping training for a specific filter of the plurality of filters when the specificity of the specific filter is greater than a threshold; and
to classify an input based on features obtained by convolving the input with the plurality of trained filters.

10. The apparatus of claim 9, in which the at least one processor is further configured to stop training of a specific filter when a change in the specificity of the specific filter is less than a threshold after the predetermined number of training iterations.

11. The apparatus of claim 9, in which the specificity is based on at least one of entropy, change from original values, variance weight values, difference from other filters, cross correlation with other filters, or a combination thereof.

12. The apparatus of claim 9, in which the at least one processor is further configured to train the neural network model while augmenting an error function with a pooled measure of the specificity of the plurality of filters.

13. The apparatus of claim 9, in which the at least one processor is further configured to determine a target network complexity of the neural network model, based on at least one of memory specification, power specifications, or a combination thereof.

14. The apparatus of claim 13, in which the at least one processor is further configured to selectively train filters based on the determined target network complexity.

15. The apparatus of claim 9, in which the at least one processor is further configured:
to prioritize filters to apply to the input based at least in part on the specificity of each of the plurality of filters; and
to select a number of prioritized filters based at least in part on a target network complexity of the neural network model.

16. The apparatus of claim 15, in which the target network complexity is based on at least one of memory specification, power specifications, or a combination thereof.

17. An apparatus of training a convolutional neural network model, comprising:
means for determining a specificity of a plurality of filters after a predetermined number of training iterations, each of the plurality of filters representing a plurality of weights;
means for eliminating a filter of the plurality of filters when a difference between an initial specificity of the filter and the determined specificity of the filter is less than a threshold;
determining whether to continue the training of each remaining filter based at least in part on the specificity;
means for continuing, after eliminating the filter, training each remaining filter of the plurality of filters based at least in part on the specificity; and
stopping training for a specific filter of the plurality of filters when the specificity of the specific filter is greater than a threshold; and
means for classifying an input based on features obtained by convolving the input with the plurality of trained filters.

18. The apparatus of claim 17, further comprising means for stopping training of a specific filter when a change in the specificity of the specific filter is less than a threshold after the predetermined number of training iterations.

19. The apparatus of claim 17, in which the specificity is based on at least one of entropy, change from original values, variance weight values, difference from other filters, cross correlation with other filters, or a combination thereof.

20. A non-transitory computer-readable medium for training a convolutional neural network model, the computer-readable medium having program code recorded thereon, the program code being executed by a processor and comprising:
program code to determine a specificity of a plurality of filters after a predetermined number of training iterations, each of the plurality of filters representing a plurality of weights;
program code to eliminate a filter of the plurality of filters when a difference between an initial specificity of the filter and the determined specificity of the filter is less than a threshold;
program code to determine whether to continue the training of each remaining filter based at least in part on the specificity;
program code to continue, after eliminating the filter, to train each remaining filter of the plurality of filters based at least in part on the specificity; and
program code to stop training for a specific filter of the plurality of filters when the specificity of the specific filter is greater than a threshold; and
program code to classify an input based on features obtained by convolving the input with the plurality of trained filters.

* * * * *